Nov. 11, 1924. Re. 15,943

I. C. POPPER

RAILWAY SWITCH HEATER

Original Filed Dec. 16, 1919 4 Sheets-Sheet 1

Inventor

Isaac C. Popper

By Vernon E. Hodges his Attorney

Nov. 11, 1924. Re. 15,943

I. C. POPPER

RAILWAY SWITCH HEATER

Original Filed Dec. 16, 1919 4 Sheets-Sheet 2

Inventor

Isaac C. Popper

By Truman E. Hodges his Attorney

Nov. 11, 1924. Re. 15,943

I. C. POPPER

RAILWAY SWITCH HEATER

Original Filed Dec. 16, 1919 4 Sheets-Sheet 3

Inventor

Isaac C. Popper

By William E. Hodges his Attorney

Nov. 11, 1924.

I. C. POPPER

Re. 15,943

RAILWAY SWITCH HEATER

Original Filed Dec. 16, 1919 4 Sheets-Sheet 4

Inventor
Isaac C. Popper
By William E. Hodges
his Attorney

Reissued Nov. 11, 1924.

Re. 15,943

UNITED STATES PATENT OFFICE.

ISAAC C. POPPER, OF NEW YORK, N. Y., ASSIGNOR TO THE THEROZ COMPANY, OF NEW YORK, N. Y., A CORPORATION OF NEW JERSEY.

RAILWAY-SWITCH HEATER.

Original No. 1,396,664, dated November 8, 1921, Serial No. 345,331, filed December 16, 1919. Renewed September 14, 1921. Serial No. 500,704. Application for reissue filed August 23, 1922. Serial No. 583,926.

*To all whom it may concern:*

Be it known that I, ISAAC C. POPPER, a citizen of the United States, residing at New York city, county of New York, and State of New York, have invented an Improvement in Railway-Switch Heaters, of which the following is a specification.

My invention relates to railway switch heaters, designed more particularly for use with solidified alcohol or the like as a fuel, which are adapted to be placed under the rails particularly beneath the switch points and between the ties, being of such length as to extend completely across the bed of the track and project a suitable distance beyond the rails on either side thereof.

The object of my invention is to prevent the snow and ice from accumulating between the switch points, and to melt the ice and snow in the bed of the track between these points.

A further object is to construct the heaters in such a manner as to permit an easy charging and re-charging of the fuel from either end of the heaters, regardless of the accumulation of ice and snow on the bed of the road.

Figure 5:
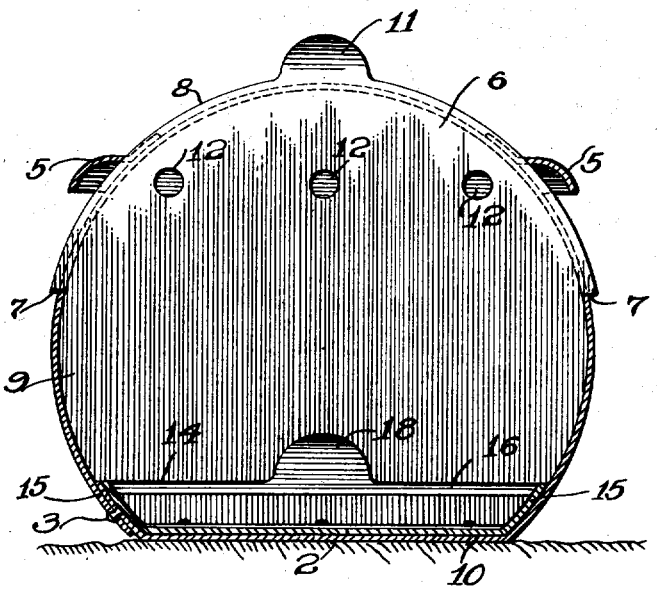
Fig. 5 is a transverse section on line 5—5 of Fig. 4.
Figure 6:
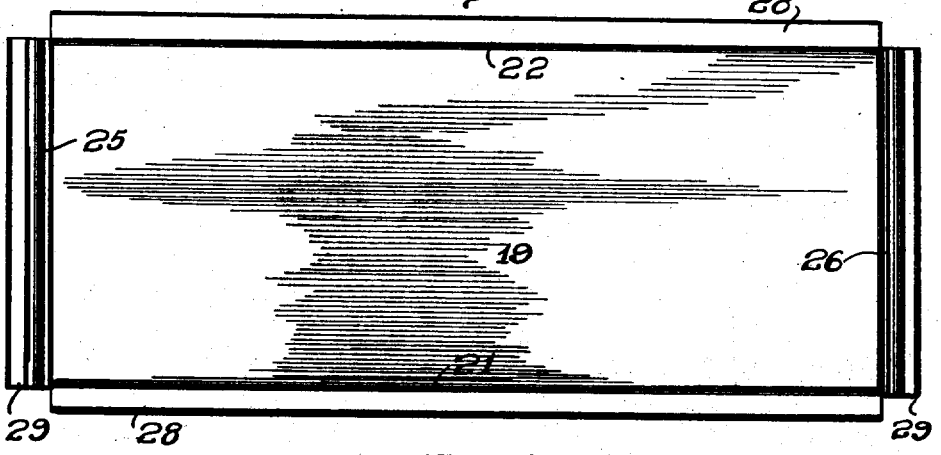
Fig. 6 is a plan view of a modified form of heater.
Figure 7:
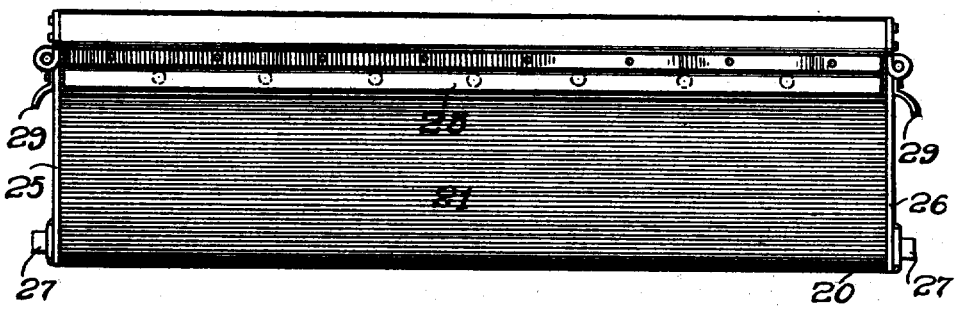
Fig. 7 is a side elevation thereof.
Figure 8:
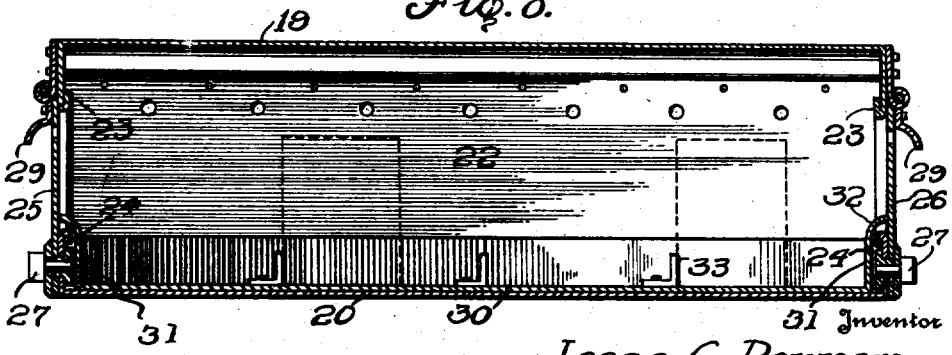
Fig. 8 is a longitudinal vertical section.
Figure 9:
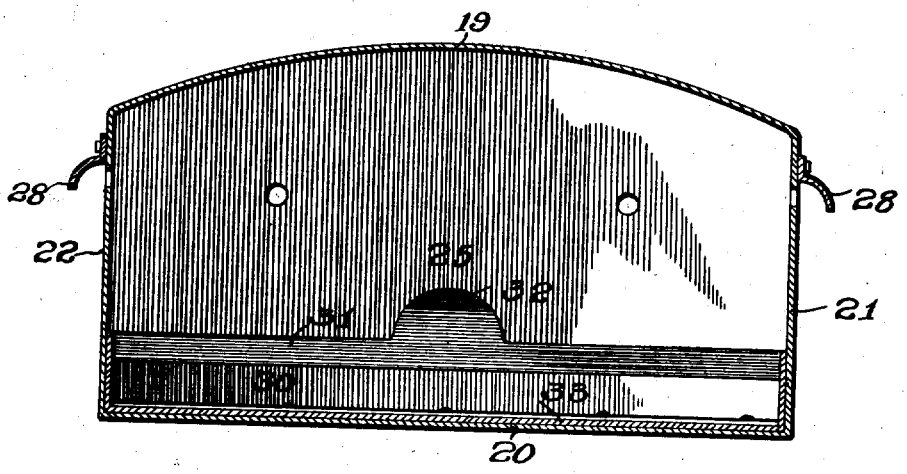
Fig. 9 is a transverse section.
Figure 10:
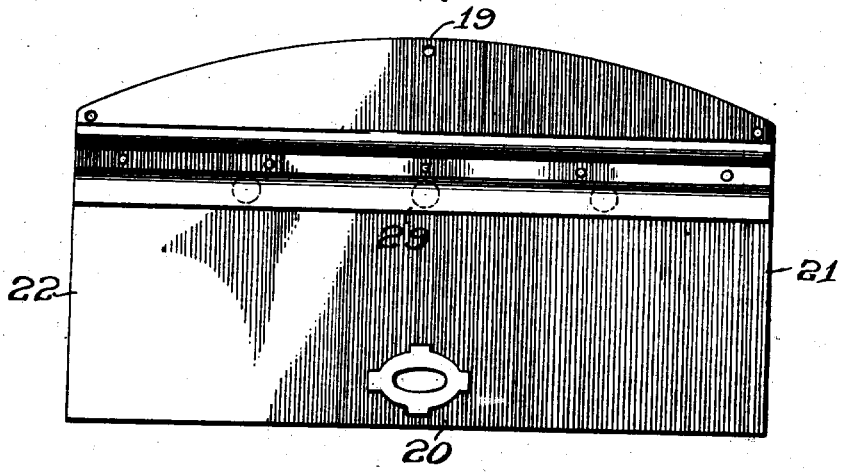
Fig. 10 is an end view.

In the preferred form of my invention, the heater consists of a metal rounded body portion 1, which acts to shed off or melt the falling snow, or the accumulation of water from the melting ice, and a flattened bottom portion 2, the whole made preferably of one piece and suitably fastened together as at 3, see Fig. 5. The wall portions of the body portion 1 are provided with a longitudinal row of perforations 4 and placed near the roof of the heater, said perforations being protected from the water by suitable flanges 5, 5, extending practically the entire length of the heater.

The open ends of the heater are closed preferably by vertical sliding gates 6, 6, which are received within slots 7, 7, arranged in the upper half of the body portion of either end. These gates assume a shape to conform to the cross-section of the heater, the upper rounded half 8 being of such a diameter as to project slightly above the contour of the body portion, and the lower half 9 being of such a diameter as to conform to the inner contour of the body portion and flattened along the lower edge as at 10 to rest upon the bottom of the heater.

A projection or knob 11 projects upwardly from the gate to facilitate its removal. The gates are also provided with perforations 12 in the upper portion thereof which are in line with the several perforations in the wall portion and are likewise protected from the weather by flanged members 13, 13, which are, in reality, a continuation of the flanges 5 of the wall portions. These flanges 13, 13 act to strengthen the construction as a whole.

To facilitate the charging and discharging of the heater, a sliding tray 14 is adapted to be received within the heater and rest upon the bottom thereof. This tray is provided with flanges bent upwardly along its sides and ends and end portions as at 15 and 16, and is provided at intervals along its length with transverse flanges 17, which act to divide the tray into sections to facilitate the distribution of the cans of fuel along the entire length of the heater. Each end of the tray is provided with a projection or knob 18 to render it easily removable.

In the modified form, as shown in Figs. 6, 7, 8, 9 and 10, I have disclosed a heater which generally is rectangular in shape, consisting preferably of a sheet-metal top 19, a bottom 20, and perforated sides 21 and 22, the bottom and top bent inwardly at their ends to form flanges 23 and 24. Perforated doors 25 and 26 which are preferably hinged to the downwardly projecting flanges 23 of the top member 19 are adapted to form a closure for each end, being provided on their lower ends with suitable fastening means 27. The perforations in the sides and doors are preferably protected from the weather by suitable flanges 28 and 29 respectively. Received within the heater and on the bottom is a tray 30 similar to tray 14 bent upwardly at either end as at 31 and provided with a knob or projection 32 to render the tray easily removable when desirable. Transverse flanges 33 are arranged at intervals along the tray to divide the latter into suitable sections, in order that the cans of fuel may be properly distributed to render the greatest efficiency.

Figure 1:
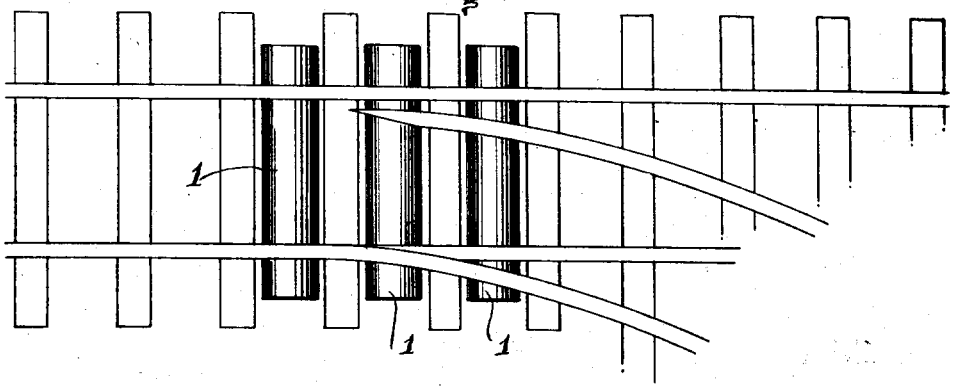
Fig. 1 is a plan view of a portion of the track showing the heaters in position therewith.
Figure 2:
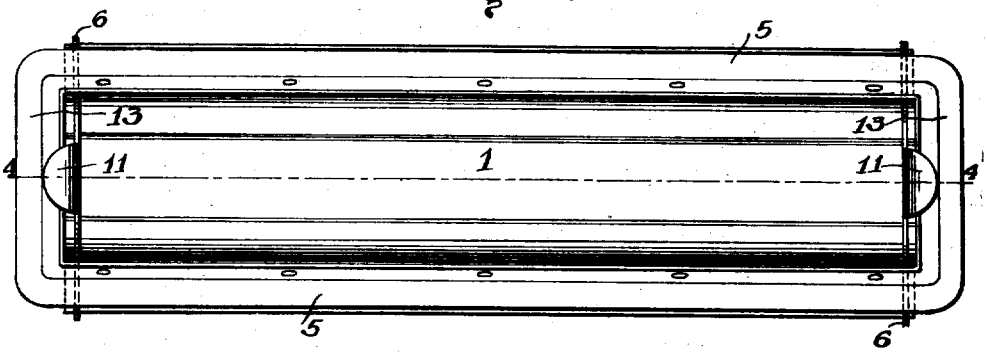
Fig. 2 is a top plan view of the heater.
Figure 3:
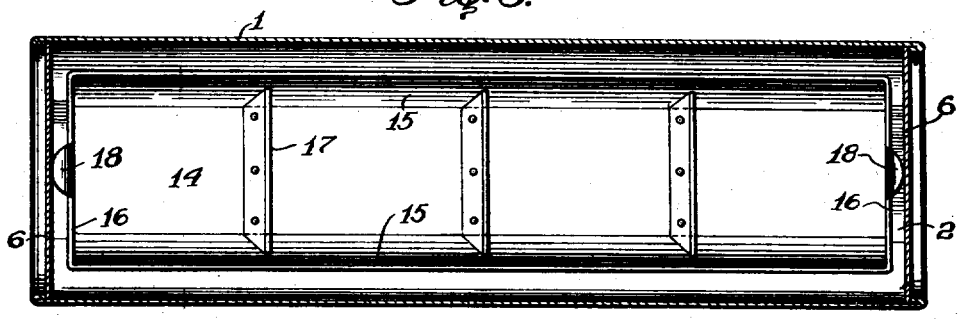
Fig. 3 is a horizontal sectional view of the heater.
Figure 4:
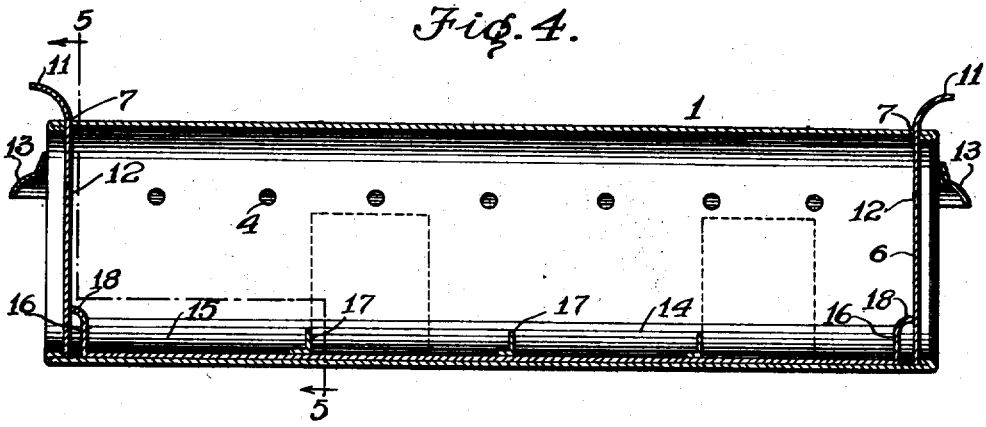
Fig. 4 is a vertical longitudinal section on line 4—4 of Fig. 2.

The heaters may be used wherever desired, but are more specifically adapted to be used in keeping switch points free from snow and ice. As shown in Fig. 1, the heaters are placed under the rails and between the ties, the number of heaters used, depending upon the size of the switch.

As disclosed, I have provided a heater for the above purpose which is very simple in construction, very easily installed, and one wherein the fuel may be easily placed or replaced as desired with the least amount of trouble, making it possible for one attendant to tend several miles of switches as compared with three or four men now required to take care of some two switches in severe weather.

I claim:

1. A railway switch heater including a top plate and fuel cans removably placed therein, the top plate confining and distributing the heat from the cans.

2. The combination with rails, ties, and movable switch points, of a series of heating chambers in the spaces formed by and between rails and ties and adjacent the switch points for confining and distributing heat, and fuel cans removably held in said chambers.

3. A heater comprising a top, bottom, perforated sides and ends, one of said ends adapted to be removable, the space between the top and bottom adapted to receive the fuel by which the heater is heated.

4. A heater comprising a top, bottom, perforated sides and ends, the ends adapted to be removable, and a tray removable from either end adapted to receive the fuel by which the heater is heated.

5. A heater comprising a top, bottom, perforated sides and ends, one of said ends removable, shields arranged above said perforations in the sides and ends, the space between the top and bottom adapted to receive the fuel by which the heater is heated.

6. A heater comprising a top, bottom, perforated sides and open ends, a shield extending longitudinally of the sides and above the perforations and across the upper portion of the open ends, and removable gates adapted to close the ends of the heater.

7. A heater comprising a top, bottom, perforated sides and open ends, a shield extending longitudinally of the sides and above the perforations and across the upper portions of the ends, and removable perforated ends adapted to close the open ends having perforations therein, which are adapted to be shielded by the transversely arranged shields.

8. A heater comprising a top, bottom, perforated sides and ends, one of said ends removable, and shields arranged above the said perforations in the sides and ends, a removable tray arranged within said heater adapted to be removable from either end, which is adapted to receive the fuel by which the stove is heated.

9. A heater comprising a top, bottom, perforated sides and open ends, a shield extending longitudinally of the sides and above the perforations and across the upper portion of the ends, removable perforated gates adapted to close the open ends of the heater, said perforations adapted to be shielded by the transversely arranged shields, and a removable tray received in the bottom of said heater which is adapted to receive the fuel to heat the heater.

10. A railroad switch heater including a horizontally disposed tube, one entire end of which is open, said tube adapted and constructed to be placed in the space between ties for radiating heat to the rails thereabove, and means for opening and closing said tube.

11. A railroad switch heater including a horizontally disposed tube constructed and adapted to be placed in the space between ties and parallel therewith, for radiating heat to the rails thereabove, and having a removable device adapted to receive a heating medium and to convey it to the proper place in the tube.

12. A heater including a horizontal tube, a slide therein, and burners detachably held on the slide at predetermined points, the tube forming a horizontally disposed housing and radiating means.

13. A heater including a tube adapted to lie horizontally and receive portable and removable burners therein, and provided with vents at the upper portion thereof for the escape of the products of combustion.

14. A railroad switch heater including a horizontally disposed tube constructed and adapted to be placed in the space between ties and parallel therewith, having ventilating openings therein, and a removable device adapted to receive a heating medium and to convey it to a proper place in the tube.

In testimony whereof I affix my signature.

ISAAC C. POPPER.